(12) United States Patent
Lorenz

(10) Patent No.: US 7,996,928 B2
(45) Date of Patent: Aug. 16, 2011

(54) COMBINATION TOILET AND DEHUMIDIFIER

(75) Inventor: Martin H. Lorenz, Racine, WI (US)

(73) Assignee: Judith W. Lorenz, Racine, WI (US)

(*) Notice: Subject to any disclaimer, the term of this patent is extended or adjusted under 35 U.S.C. 154(b) by 0 days.

(21) Appl. No.: 12/687,263

(22) Filed: Jan. 14, 2010

(65) Prior Publication Data

US 2010/0107325 A1 May 6, 2010

Related U.S. Application Data

(60) Provisional application No. 61/217,058, filed on May 26, 2009.

(51) Int. Cl.
*E03D 1/20* (2006.01)
(52) U.S. Cl. ...................... 4/364; 4/353; 62/3.4
(58) Field of Classification Search .............. 4/363–364; 62/3.4
See application file for complete search history.

(56) References Cited

U.S. PATENT DOCUMENTS

| 3,740,959 | A | 6/1973 | Foss | |
| 5,259,203 | A * | 11/1993 | Engel et al. | 62/150 |
| 5,450,634 | A | 9/1995 | Mohrman | |
| 6,317,899 | B1 | 11/2001 | Brewer | |
| 6,877,170 | B1 | 4/2005 | Quintana et al. | |
| 2002/0157177 | A1* | 10/2002 | Sakura | 4/364 |
| 2007/0113331 | A1 | 5/2007 | Prokopenko et al. | |
| 2007/0174959 | A1 | 8/2007 | Sanders et al. | |
| 2008/0245092 | A1* | 10/2008 | Forsberg et al. | 62/288 |
| 2009/0119827 | A1* | 5/2009 | Sokolowski | 4/353 |

FOREIGN PATENT DOCUMENTS

| CN | 1888332 | 1/2007 |
| DE | 4037389 | 5/1992 |
| JP | 2000046467 | 2/2000 |
| KR | 20050111549 | 11/2005 |

\* cited by examiner

*Primary Examiner* — Charles Phillips
(74) *Attorney, Agent, or Firm* — Michael Best & Friedrich LLP

(57) ABSTRACT

A toilet includes a dehumidifier operable to draw water vapor from the air and discharge water. A tank is configured to store the water discharged from the dehumidifier. A drain valve is movable from a closed position to an open position whereby the toilet is flushed solely with the water discharged from the dehumidifier and stored in the tank.

16 Claims, 5 Drawing Sheets

COMBINATION TOILET AND DEHUMIDIFIER

CROSS-REFERENCE TO RELATED APPLICATIONS

This application claims the benefit of U.S. Provisional Patent Application No. 61/217,058, filed May 26, 2009, the entire contents of which are hereby incorporated by reference.

BACKGROUND

The present invention relates to water conservation for flushable toilets. More particularly, the invention relates to a toilet that is flushable with water from a conventional building water supply or flushable with water from an alternate source.

SUMMARY

In one embodiment, the invention provides a toilet including a dehumidifier operable to draw water vapor from the air and discharge water. A tank is configured to store the water discharged from the dehumidifier. A drain valve is movable from a closed position to an open position whereby the toilet is flushed solely with the water discharged from the dehumidifier and stored in the tank.

In another embodiment, the invention provides a toilet including a dehumidifier operable to draw water vapor from the air and discharge water. A tank has a first chamber configured to receive and store the water discharged from the dehumidifier and a second chamber configured to receive and store water from a standard building water supply. A flushing mechanism is operable to enable flushing of the toilet with water from at least one of the first chamber and the second chamber.

In yet another embodiment, the invention provides a toilet including a dehumidifier operable to draw water vapor from the air and discharge water. A tank has a first chamber configured to receive and store the water discharged from the dehumidifier and a second chamber configured to receive and store water from a standard building water supply. A first flush handle is operable to actuate a first drain valve for flushing the toilet solely with water from the first chamber that has been discharged from the dehumidifier. A second flush handle is operable to actuate a second drain valve for flushing the toilet with water from the second chamber that has been supplied by the standard building water supply. A float switch is positioned in the first chamber and operable to disable the operation of the dehumidifier when the water level in the first chamber meets a predetermined level. An indicator light is operable to illuminate in response to the water level in the first chamber reaching the predetermined level.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
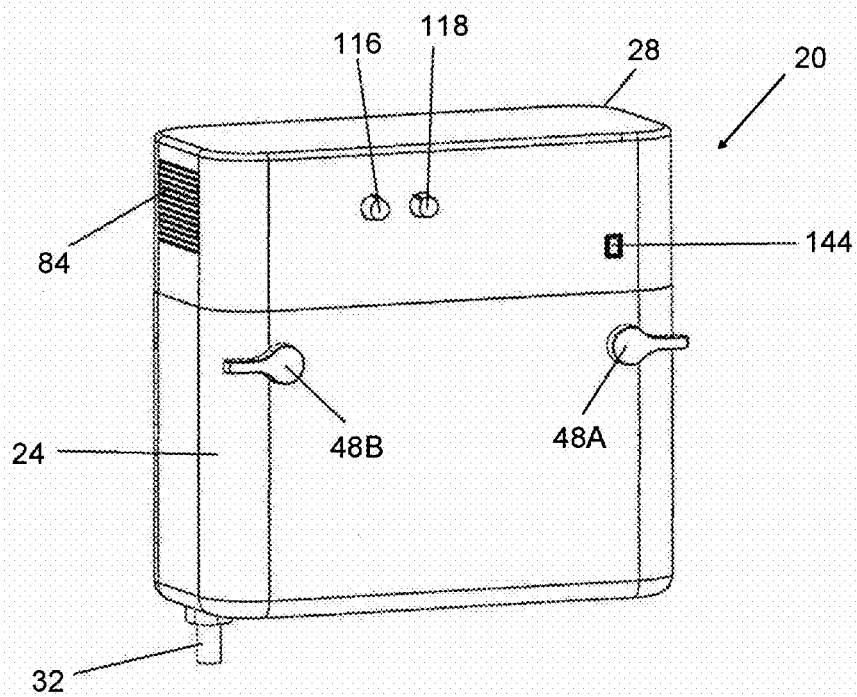
FIG. 1 is a perspective view of a toilet embodying the invention with the bowl removed from view.
Figure 2:
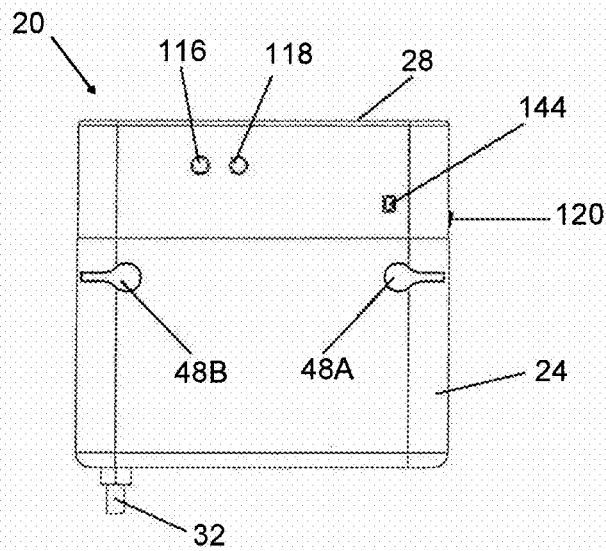
FIG. 2 is a front view of the toilet of FIG. 1.
Figure 3:
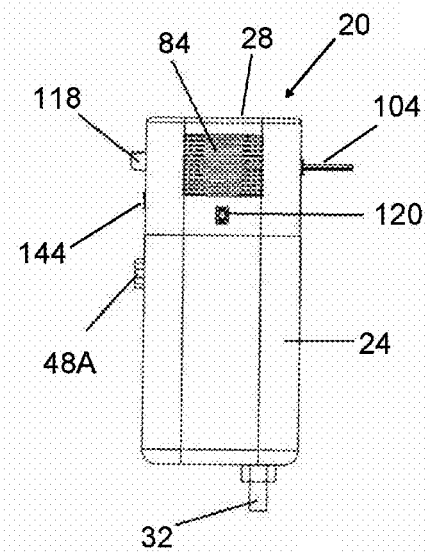
FIG. 3 is a side view of the toilet of FIG. 1.

FIGS. 1-3 illustrate a toilet 20. The toilet 20 includes a tank 24, a dehumidifier 28, and a bowl (not shown). Water stored in the tank 24 is selectively released to the bowl to flush out the contents of the bowl. As described in further detail below, water for flushing the toilet 20 can be supplied to the tank 24 in multiple manners. The tank 24 includes an inlet fitting 32 in a bottom end thereof. The inlet fitting 32 is configured to be coupled via a flexible water hose or other conduit to a water supply such as a building water supply (not shown). The building water supply can be sourced from virtually any source (e.g., city water, well water, rainwater collection, etc.) and is typically plumbed into the walls of a building structure to provide water on demand. However, water is also supplied to the tank 24 from the dehumidifier 28.

Figure 4:
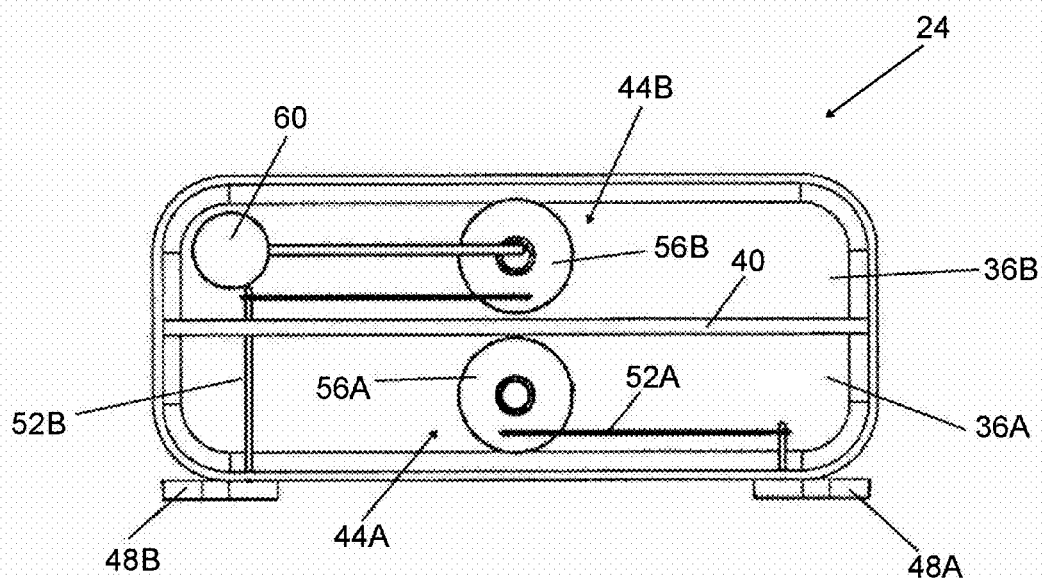
FIG. 4 is a top view of a tank portion of the toilet of FIG. 1.
Figure 5:
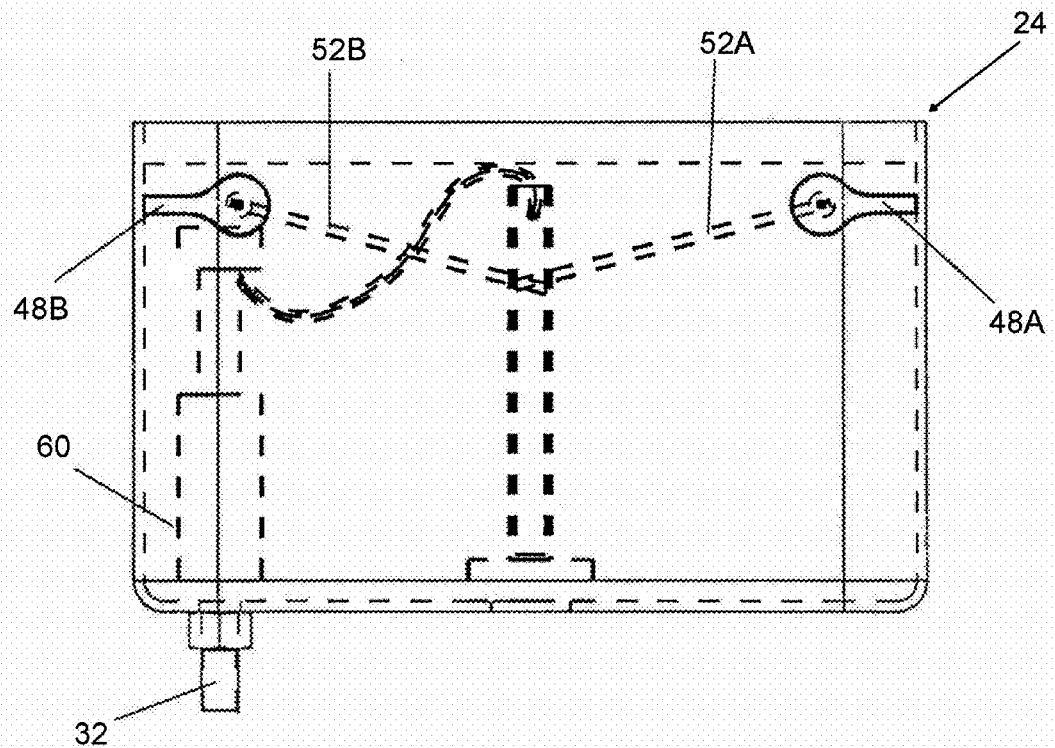
FIG. 5 is a front view of the tank portion of the toilet of FIG. 1.

As shown in FIGS. 4 and 5, the tank 24 includes a first chamber 36A and a second chamber 36B. In the illustrated construction, the first and second chambers 36A, 36B are substantially equal in volume and are split front-to-back by a divider 40. However, the tank 24 may be split into separate chambers in other manners in alternate constructions. A drain valve 44A, 44B is positioned at the bottom of each of the respective chambers 36A, 36B for selectively draining the corresponding tank chamber upon actuation of a flushing mechanism. The flushing mechanism in the illustrated construction includes independent flush handles 48A, 48B. Each of the flush handles 48A, 48B is coupled to the corresponding drain valve 44A, 44B via a linkage 52A, 52B, which operates to lift a flapper 56A, 56B of the corresponding drain valve 44A, 44B upon the flush handle 48A, 48B being depressed. Thus, the toilet 20 can be flushed with either the water stored in the first chamber 36A or the water stored in the second chamber 36B. This is particularly advantageous in the event that the building water supply is damaged, inoperable in whole or part, or subject to failure or outage for any reason (e.g., pipe breakage, inadequate water supply, power failure disrupting operation of an electrical well pump, etc.). The toilet 20 can also be flushed using both handles 48A, 48B for a double-flush effect. An automatic fill/shutoff device 60 is provided in the second chamber 36B in communication with the inlet fitting 32 so that water from the on-demand building water supply is fed into the second chamber 36B to fill the same immediately after the water is drained from the second chamber 36B. Thus, the toilet 20 can operate in the usual manner by using the second flush handle 48B. However, additional flushing operability is also provided as described below.

The dehumidifier 28 is positioned on top of the tank 24, as shown in FIGS. 1-3, and includes a housing 80 (FIG. 6) having a perimeter shape substantially identical to a perimeter shape of the tank 24. The dehumidifier 28 is shown in detail in FIGS. 6 and 7. The dehumidifier housing 80 includes slotted vents 84 at each side. Inside the dehumidifier 28 are a motorized fan 88, a compressor 92, moisture collecting coils 96, and condenser coils 100. The dehumidifier 28 receives electrical power through a power cord 104 that extends through a back panel 108 of the housing 80. The power cord 104 may be provided with a standardized plug for insertion into an electrical socket, or the dehumidifier 28 may be configured to receive electrical power from a battery, generator, or any available power source, either on-board or externally-provided. In some constructions, the dehumidifier is provided with electrical power from a stand-alone power source, such as a fuel-burning generator, solar panel, wind turbine, etc. that does not rely on an established power grid and is thus, not reliant upon the operability of such grid. Thus, the toilet 20 can remain operable without a standard water supply and without a standard electrical power supply in some constructions. Adjustable controls on a front panel 112 of the housing 80 include a humidistat 116 and a defrost control 118. A power switch 120 is provided on a side panel 124 of the housing 80.

The dehumidifier 28 operates in a conventional manner to draw out humidity (i.e., water vapor) from the air and discharge liquid water. The water vapor from the air that is condensed to liquid by the dehumidifier 28 is discharged into the first chamber 36A of the tank 24 for storage. The dehumidifier 28 is the only source for filling the first chamber 36A since the inlet fitting 32 and the automatic fill/shutoff device 60 are only in communication with the second chamber 36B and not the first chamber 36A.

Figure 6:
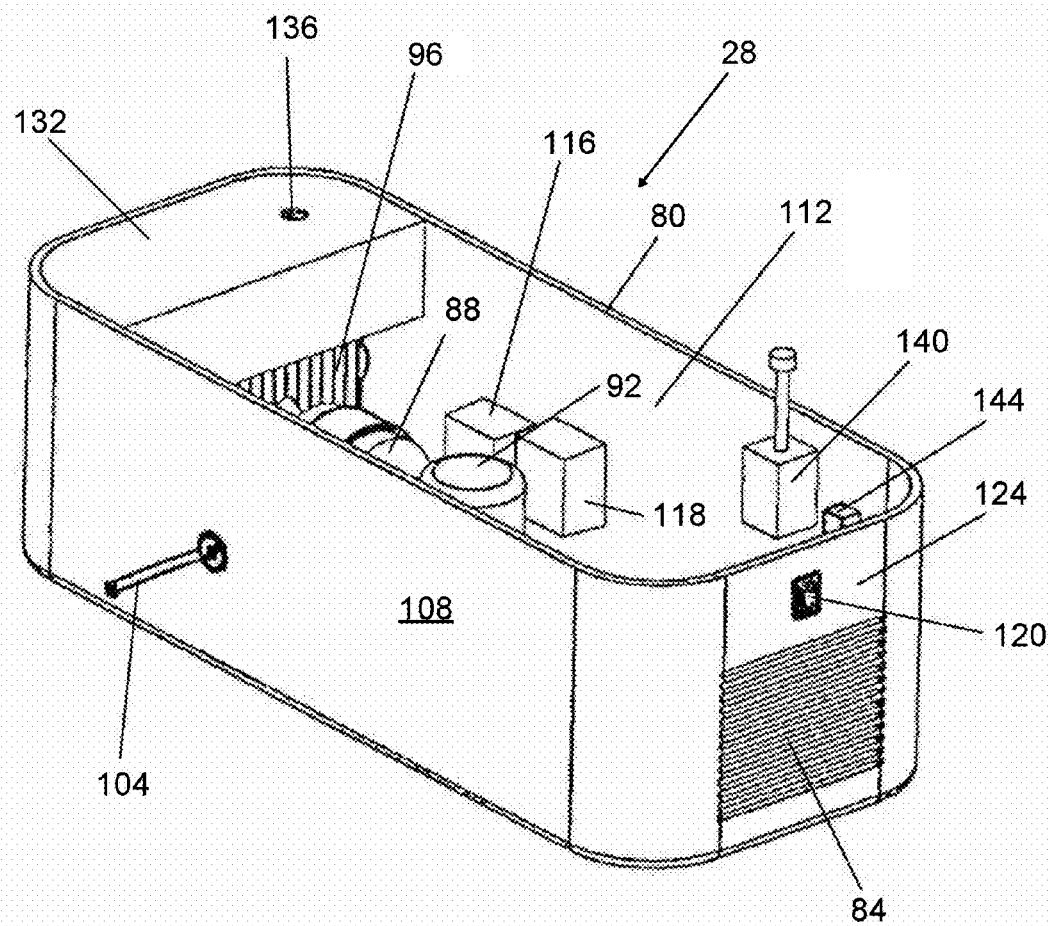
FIG. 6 is a perspective view showing the underside of a dehumidifier portion of the toilet of FIG. 1.
Figure 7:
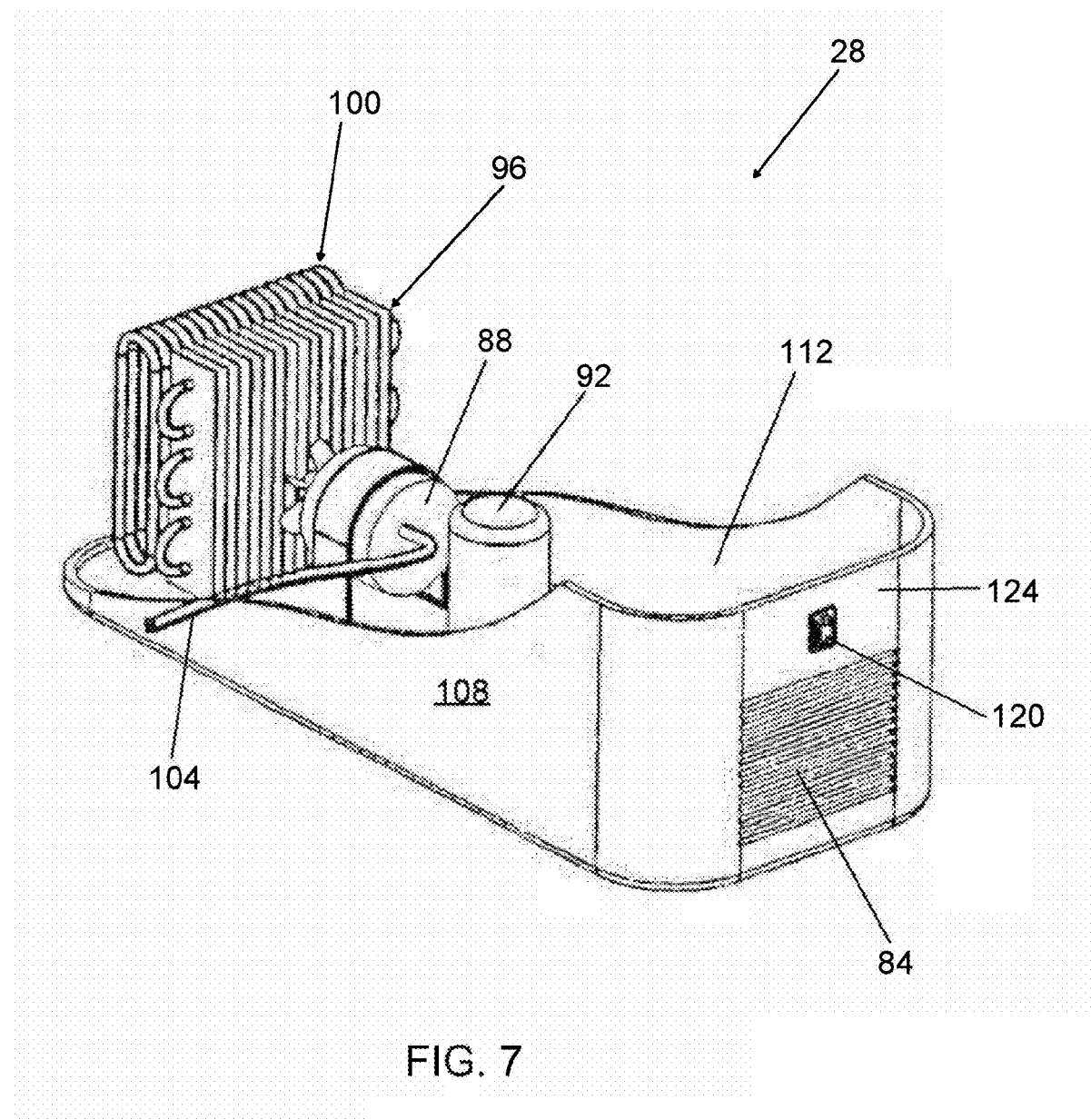
FIG. 7 is a perspective view of the dehumidifier portion of the toilet of FIG. 1 with a portion of the housing cut away.
Figure 8:
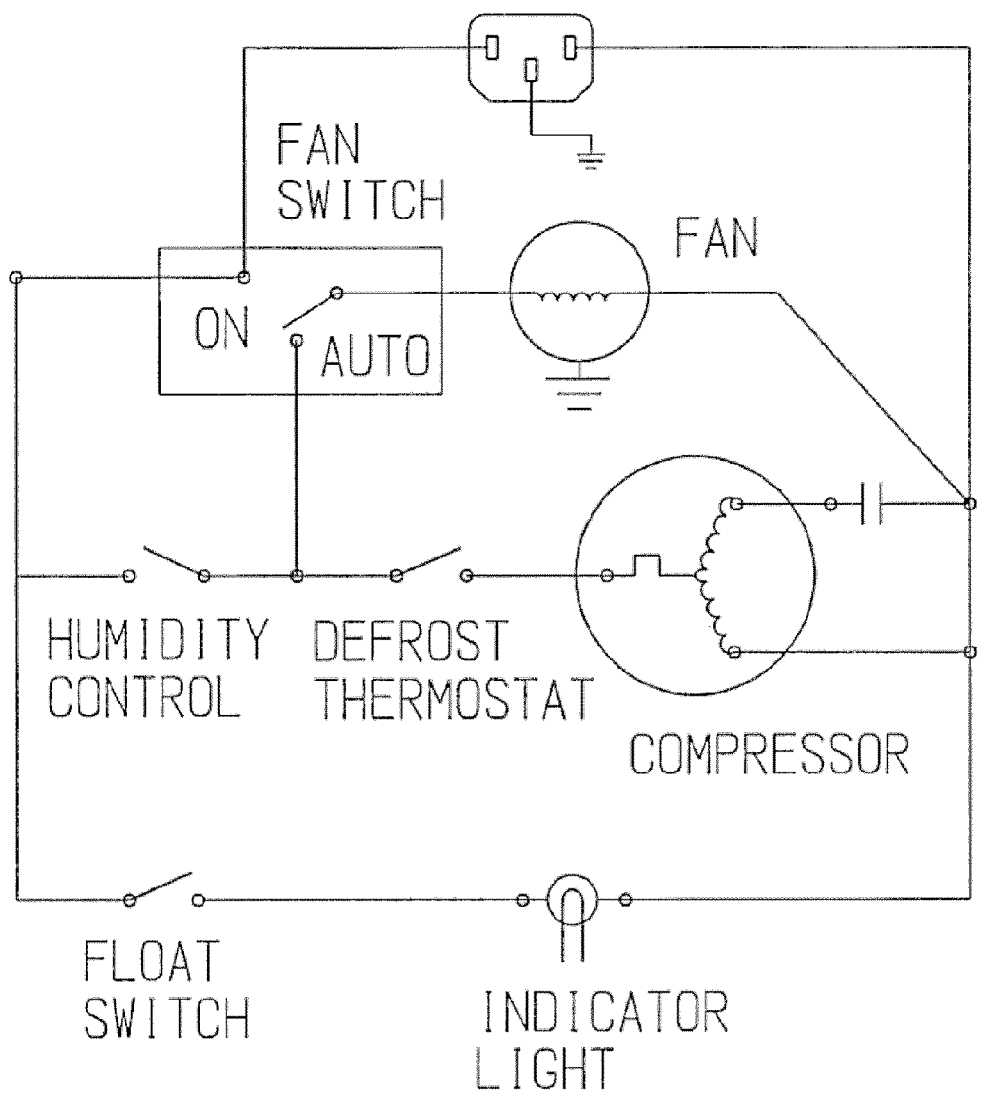
FIG. 8 is a schematic operational diagram for the dehumidifier portion of the toilet of FIG. 1.

As the dehumidifier 28 operates, condensation forms on the chilled moisture collecting coils 96 and drips into a collection pan 132 (FIG. 6). The water from the dehumidifier 28 then drains through an aperture 136 from the collection pan 132 into the first chamber 36A. A float switch 140 (FIG. 6) is responsive to the water level in the first chamber 36A achieving a predetermined level. Thus, it can be said that the float switch 140 is responsive to the amount of water discharged from the dehumidifier 28. The predetermined level of water in the first chamber 36A can correspond to a volume of water that is desired for a single flush of the toilet 20 (e.g., about 1.6 gallons). When the water level reaches the predetermined level in the first chamber 36A, the float switch 140 is moved by buoyancy from a first position to a second position so that the operation of the dehumidifier 28 is stopped and a visual indicator is triggered. In the illustrated construction, the visual indicator is a light 144 in the front panel 112 of the housing 80 that is illuminated when the float switch 140 is closed. The illumination of the light 144 (or other visual indication responsive to the float switch 140) indicates to an observer that the toilet 20 is able to be flushed with the first flush handle 48A to carry out a "full flush" of the toilet 20 (that is to say substantially equivalent in water volume to a flush effected by the second flush handle 48B, which utilizes the second chamber 36B). Of course, the water from the first chamber 36A may be released through the drain valve 44A at any time, regardless of the amount of water in the first chamber 36A, but the light 144 indicates when a full flush can be expected, rather than a partial flush, when using the first flush handle 48A. After a flush from chamber 36A, the float switch 140 moves from the second position to the first position, and the dehumidifier 28 is again connected with electrical power to begin collecting water to fill the first chamber 36A. The time required to fill the first chamber 36A depends upon the humidity level of the surrounding air and the setting of the humidistat 116.

Besides the light 144 in the front panel 112, the toilet 20 can be provided with a different type of visual indicator to indicate to an observer that the first chamber 36A is at capacity and ready to be used for flushing the toilet 20. For example, a translucent viewing window may be formed in the tank 24 at a location along the first chamber 36A in an area proximate the first flush handle 48A. The tank 24 may be provided with a mark on or adjacent to the viewing window that corresponds to the predetermined water level. In such a construction, the float switch 140 may or may not be present. In a construction without the float switch 140, additional water from the dehumidifier 28 beyond that corresponding to the predetermined level may be diverted to an overflow drain. In such a construction, even though some water from the dehumidifier 28 may be drained away, the water conservation effect of the toilet 20 is still great since the toilet 20 is able to be flushed at full capacity (equal to a flush carried out with on-demand building water) solely with water condensed from the humidity in the air. Furthermore, a double-flush can be carried out, using both flush handles 48A, 48B to flush, without doubling the demand on the building water supply since only half of the flush volume (e.g., 1.6 gallons) is taken from the building water supply.

The toilet 20 enables the overall water demand for a household, business, school, etc. to be significantly reduced. In widespread use throughout a community, region, or country, the toilet 20 is able to save that community, region, or country significant resources—not simply reducing total water volume demand, but creating a positive domino effect with the associated costs of pumping, water treatment, desalination, etc.

Furthermore, the amount of water that can be expected to be discharged by the dehumidifier 28 is great due to the likely environment of the toilet 20 being an enclosed bathroom, which may include at least one of a shower and a bath tub. In fact, others have recognized the need for dehumidifying the air in a bathroom, and even contemplated incorporating a dehumidifier with a toilet (such as U.S. Pat. No. 3,740,959 to Foss), but have neglected the full potential realized by the toilet 20 described herein. For example, Foss' device provides a humidifier-dehumidifier device in which the water closet acts as a cycling reservoir in the humidifying mode and a catch basin in the dehumidifying mode. Since the water closet is automatically filled upon a flush and not provided with a separate volume for water from the dehumidifier, any excess water harvested from the dehumidifier (and its inherent flushing potential) is lost through the conventional overflow means of the water closet, and preservation of the on-demand water supply is not accomplished.

Various features and advantages of the invention are set forth in the following claims.

What is claimed is:
1. A toilet comprising:
a dehumidifier operable to draw water vapor from the air and discharge water;
a tank divided into a first chamber and a separate second chamber, wherein the second chamber includes an inlet for connection with a standard building water supply, and the first chamber has no inlet for connection with a standard building water supply, the first chamber being configured to receive and store only water discharged from the dehumidifier;
a bowl coupled to the tank to receive water from the tank;
a first drain valve positioned in the first chamber and movable from a closed position to an open position whereby the toilet bowl is flushed solely with the water discharged from the dehumidifier and stored in the first chamber of the tank;

a second drain valve positioned in the second chamber and movable from a closed position to an open position whereby the toiled bowl is flushed with water from the second chamber;

a humidity control input that controls the running of the dehumidifier to maintain a desired humidity level in the surrounding air; and a float switch positioned inside the first chamber of the tank and operable to prevent the running of the dehumidifier when the amount of water accumulated in the first chamber of the tank reaches a predetermined flush volume, wherein the dehumidifier is positioned on top of the tank to provide a cover for the tank.

2. The toilet of claim 1, further comprising a first flush handle coupled to the first drain valve and a second flush handle coupled to the second drain valve.

3. The toilet of claim 1, further comprising a visual indicator responsive to the amount of water discharged from the dehumidifier to provide a visual indication when the amount of water accumulated from the dehumidifier reaches a predetermined flush volume of water in the first chamber of the tank.

4. The toilet of claim 3, wherein the visual indicator is a light configured to be illuminated in response to a float switch inside the first chamber of the tank.

5. The toilet of claim 1, wherein the dehumidifier includes a housing having a perimeter shape substantially identical to a perimeter shape of the tank.

6. A toilet comprising:
a dehumidifier operable to draw water vapor from the air and discharge water;

a tank having a first chamber configured to receive and store the water discharged from the dehumidifier and having no inlet for connection to a standard building water supply, and a second chamber, separate from the first chamber, configured to receive and store water, the second chamber having an inlet for connection with a standard building water supply;

a bowl coupled to the tank to receive water from the tank;

a flushing mechanism operable to enable selective flushing of the toilet bowl with only water from the first chamber;

a humidity control input that controls the running of the dehumidifier to maintain a desired humidity level in the surrounding air; and a float switch positioned inside the first chamber and operable to prevent the running of the dehumidifier when the amount of water accumulated in the first chamber reaches a predetermined flush volume, wherein the dehumidifier is positioned on top of the tank to provide a cover for the tank.

7. The toilet of claim 6, wherein the flushing mechanism includes two independent drain valves operable by two independent flush handles, wherein a first one of the flush handles is operable to open a first one of the drain valves, which is positioned in the first chamber, to enable flushing of the toilet bowl solely with water from the dehumidifier that is stored in the first chamber.

8. The toilet of claim 6, further comprising a visual indicator responsive to the water level in the first chamber to provide a visual indication when the amount of water in the first chamber reaches a predetermined flush volume.

9. The toilet of claim 8, wherein the visual indicator is a light configured to be illuminated in response to a float switch inside the first chamber.

10. The toilet of claim 6, wherein the dehumidifier includes a housing having a perimeter shape substantially identical to a perimeter shape of the tank.

11. A toilet comprising:
a dehumidifier operable to draw water vapor from the air and discharge water;

a tank having a first chamber configured to receive and store the water discharged from the dehumidifier and a second chamber, separate from the first chamber, configured to receive and store water from a standard building water supply, the first chamber having no inlet for connection to a standard building water supply;

a bowl coupled to the tank to receive water from the tank;

a first flush handle operable to actuate a first drain valve for flushing the toilet bowl solely with water from the first chamber that has been discharged from the dehumidifier;

a second flush handle operable to actuate a second drain valve for flushing the toilet bowl with water from the second chamber that has been supplied by the standard building water supply;

a float switch positioned in the first chamber and operable to disable the operation of the dehumidifier when the water level in the first chamber meets a predetermined level; and an indicator light operable to illuminate in response to the water level in the first chamber reaching the predetermined level, wherein the dehumidifier is positioned on top of the tank to provide a cover for the tank.

12. The toilet of claim 11, wherein the dehumidifier includes a housing having a perimeter shape substantially identical to a perimeter shape of the tank.

13. The toilet of claim 11, wherein the first tank and the second tank are of substantially equal volume.

14. The toilet of claim 1, wherein only the first chamber is configured to receive water discharged from the dehumidifier.

15. The toilet of claim 6, wherein only the first chamber is configured to receive water discharged from the dehumidifier.

16. The toilet of claim 11, wherein only the first chamber is configured to receive water discharged from the dehumidifier.

* * * * *